(12) United States Patent
Sangiacomo

(10) Patent No.: US 11,510,412 B2
(45) Date of Patent: Nov. 29, 2022

(54) CONVEYOR FOR A CONTINUOUS BAKING OVEN AND CONTINUOUS BAKING OVEN COMPRISING SAID CONVEYOR

(71) Applicant: SLB S.r.l., Brescia (IT)

(72) Inventor: Paola Sangiacomo, Brescia (IT)

(73) Assignee: SLB S.R.L., Brescia (IT)

( * ) Notice: Subject to any disclaimer, the term of this patent is extended or adjusted under 35 U.S.C. 154(b) by 314 days.

(21) Appl. No.: 16/647,956

(22) PCT Filed: Sep. 18, 2018

(86) PCT No.: PCT/IB2018/057137
§ 371 (c)(1),
(2) Date: Mar. 17, 2020

(87) PCT Pub. No.: WO2019/058252
PCT Pub. Date: Mar. 28, 2019

(65) Prior Publication Data
US 2020/0260738 A1    Aug. 20, 2020

(30) Foreign Application Priority Data

Sep. 19, 2017    (IT) .................. 102017000104599

(51) Int. Cl.
| | | |
|---|---|---|
| *A21B 1/48* | (2006.01) | |
| *B65G 15/32* | (2006.01) | |
| *B65G 15/34* | (2006.01) | |
| *B65G 23/02* | (2006.01) | |
| *B65G 23/06* | (2006.01) | |
| *B65G 39/07* | (2006.01) | |
| *B65G 45/12* | (2006.01) | |

(52) U.S. Cl.
CPC .............. *A21B 1/48* (2013.01); *B65G 15/32* (2013.01); *B65G 15/34* (2013.01); *B65G 23/02* (2013.01); *B65G 23/06* (2013.01); *B65G 39/07* (2013.01); *B65G 45/12* (2013.01)

(58) Field of Classification Search
CPC .......... A21B 1/48; B65G 15/32; B65G 15/34; B65G 23/02; B65G 23/06; B65G 39/07; B65G 45/12
USPC ..................................... 198/803.14
See application file for complete search history.

(56) References Cited

U.S. PATENT DOCUMENTS

| | | | |
|---|---|---|---|
| RE24,855 E * | 8/1960 | Noel ................ | A47J 37/044 |
| | | | 198/408 |
| 2,989,932 A | 6/1961 | Egee et al. | |
| 4,280,402 A * | 7/1981 | Featherstone ........... | A21B 1/48 |
| | | | 99/423 |

(Continued)

FOREIGN PATENT DOCUMENTS

| | | |
|---|---|---|
| FR | 2651093 A | 3/1991 |
| GB | 876540 A | 9/1961 |
| WO | 2010122362 A1 | 10/2010 |

*Primary Examiner* — Mark A Deuble
(74) *Attorney, Agent, or Firm* — Volpe Koenig

(57) ABSTRACT

The invention concerns a conveyor (1) for a continuous baking oven (10), wherein the conveyor (1) is of the closed-ring type and comprises an outer surface (2) and an inner surface (3), and wherein the conveyor (1) is equipped with a plurality of seats (4) intended to receive a food product to be cooked, wherein the seats of the plurality of seats have respective mouths (5) essentially open at the level of the outer surface (2) of the conveyor.

15 Claims, 4 Drawing Sheets

(56) References Cited

U.S. PATENT DOCUMENTS

| | | | | |
|---|---|---|---|---|
| 4,560,139 | A * | 12/1985 | Dahlke | A21C 13/02 |
| | | | | 249/137 |
| 5,149,556 | A * | 9/1992 | Le Viet | A21B 2/00 |
| | | | | 426/243 |
| 6,776,612 | B2 * | 8/2004 | Backowski | F23H 11/00 |
| | | | | 432/195 |
| 7,306,444 | B2 * | 12/2007 | Heinzen | A21C 3/02 |
| | | | | 425/371 |
| 7,307,243 | B2 * | 12/2007 | Farkas | A21B 1/48 |
| | | | | 426/243 |
| 8,678,182 | B2 * | 3/2014 | Junk | B65B 43/54 |
| | | | | 198/803.14 |
| 11,220,401 | B2 * | 1/2022 | Chung | A21B 1/48 |

* cited by examiner

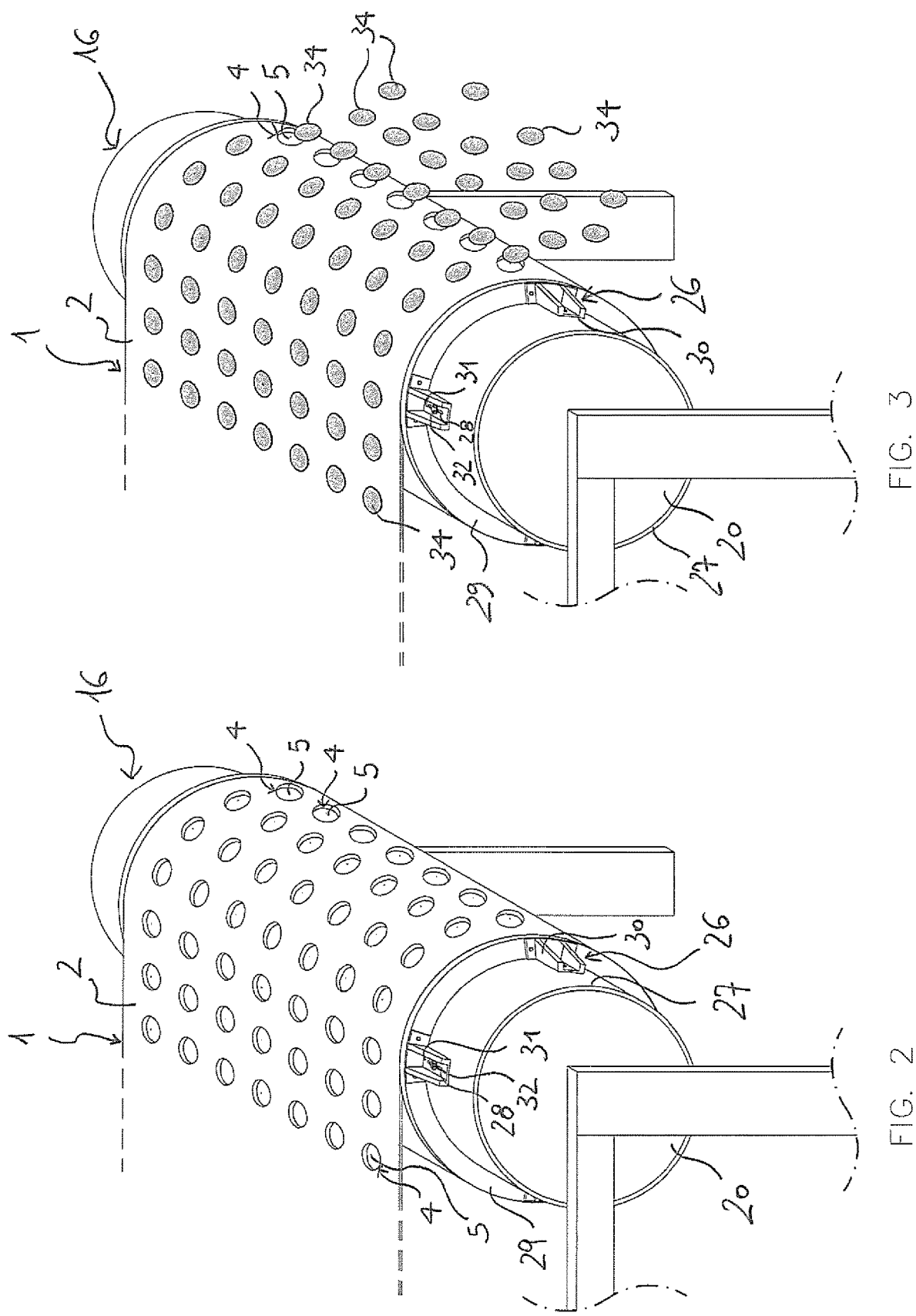

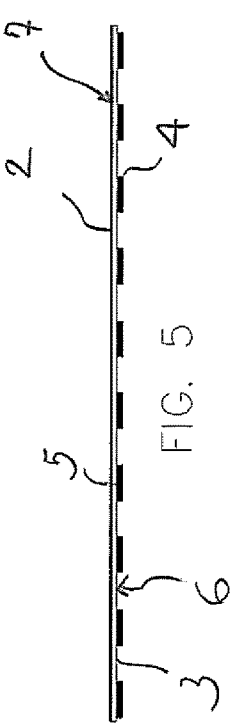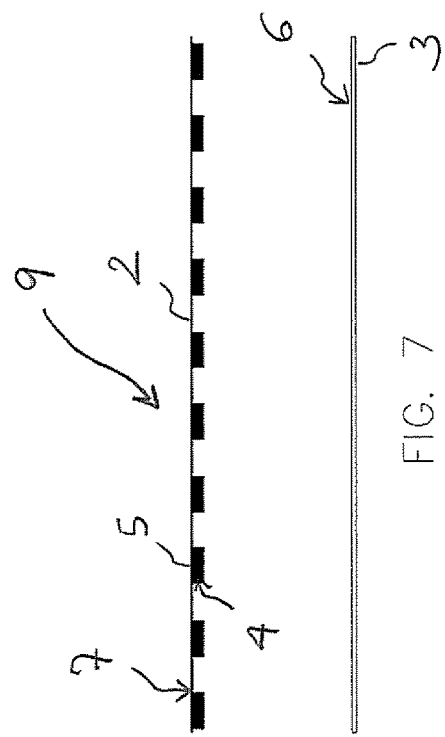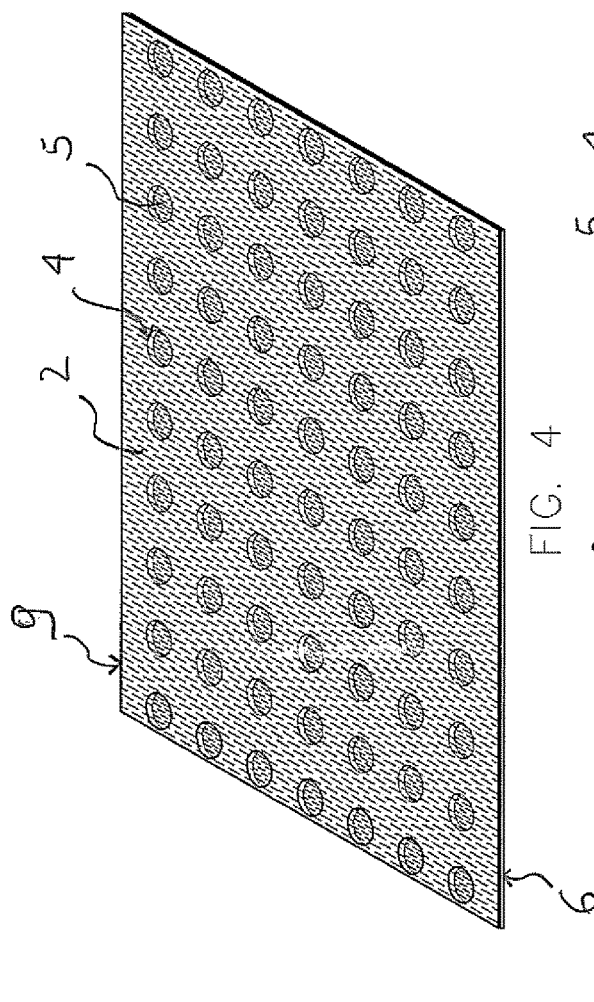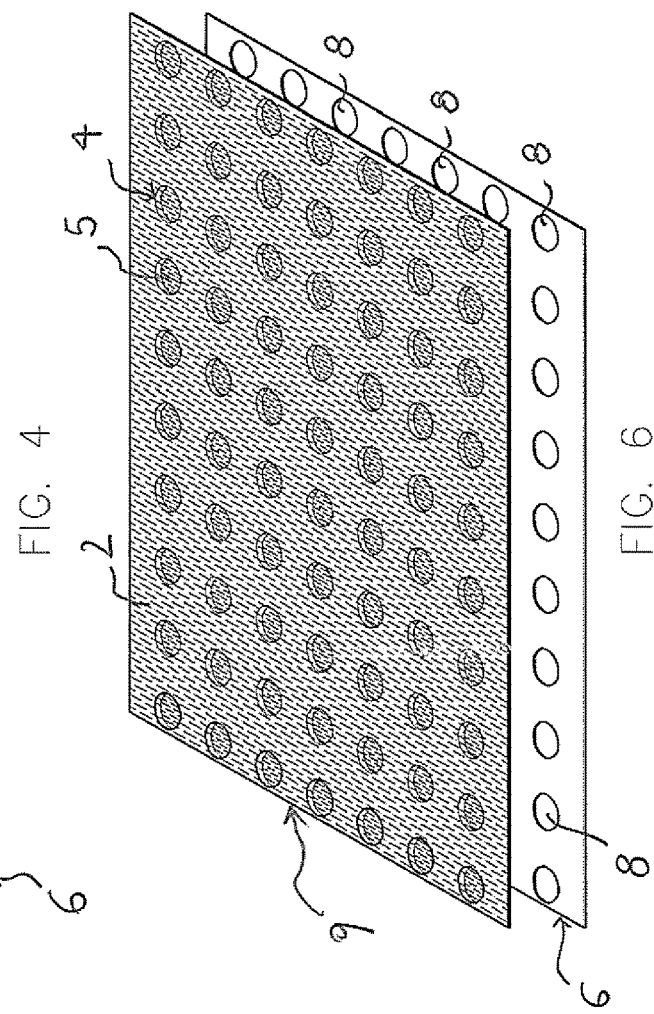

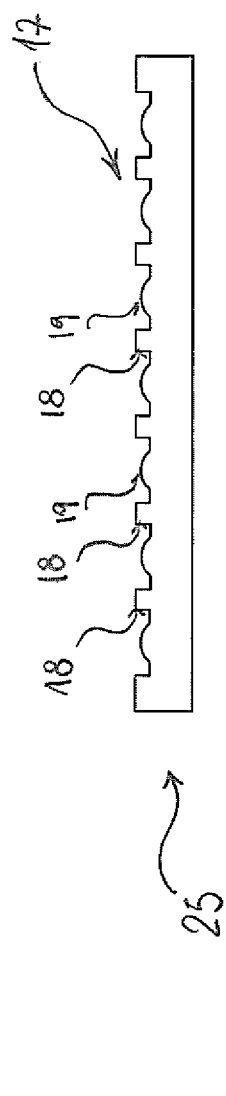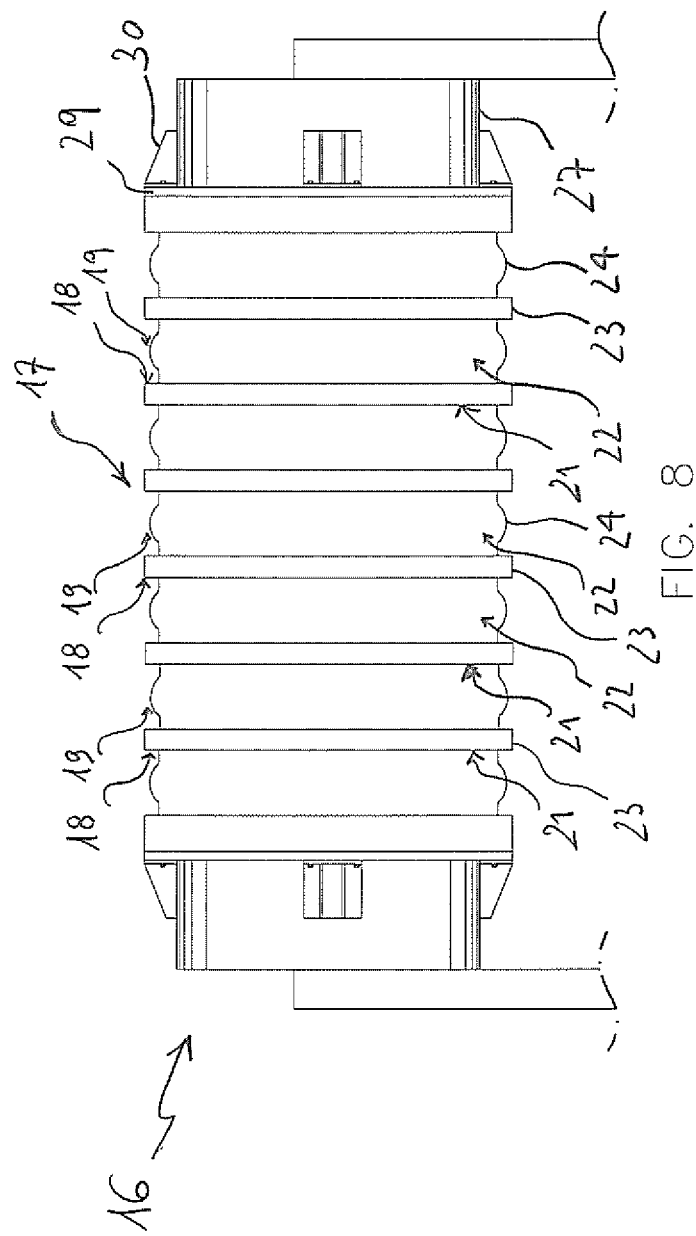

CONVEYOR FOR A CONTINUOUS BAKING OVEN AND CONTINUOUS BAKING OVEN COMPRISING SAID CONVEYOR

FIELD OF THE INVENTION

In its most general aspect, the present invention concerns the food industry sector and, in particular, the invention concerns a conveyor for a continuous baking oven and a continuous baking oven comprising this conveyor.

STATE OF THE ART

As is known in the food industry sector, there are different equipment and different processes for obtaining different types of food products.

In the specific case of cooked food products, such as the so-called bakery products for example, the known art provides continuous baking ovens, wherein a conveyor conveys the food product to be cooked from a loading station of the same food product to a baking station inside a thermal chamber of the baking oven, up to an unloading station of the cooked food product.

In processes of the aforesaid type, the food product to be cooked is arranged, in the form of a dough, in direct contact with the conveyor, or is arranged, still in the form of a dough or anyhow of a food composition of varying consistency, inside containers such as baking pans, trays or molds.

The processes with which the food product is put in direct contact with the conveyor are inconveniently neither adapted to cook food products for which the high cooking temperatures could cause an undesired excessive deformation of the dough, nor to cook food products whose consistency, before cooking, would not allow them to be arranged directly on the conveyor.

In these cases, as mentioned, the food product is sent to the thermal chamber of the baking oven inside the aforesaid containers, which are arranged on top of the conveyor and which must then be removed from the conveyor to allow the extraction of the food product at the end of the cooking.

In substance, the methods of the aforesaid type are inconvenient and provide steps of handling the containers inside which the food product is arranged, at least before and at least after the cooking step, which are generally carried out manually or mechanically with the help of robotic arms.

Moreover, as mentioned, in the aforesaid methods considered, a step of removing the cooked food product from the containers, which is added to the step of removing the container from the conveyor, is also provided. This step of removing the cooked food product can also be carried out manually or mechanically with the help of robotic arms.

In addition to depending on the skills of the designated operator, manual operations significantly slow down the production process of the food products in question, whereas the use of robotic arms requires expensive technology and large and adequate spaces for their installation.

The document FR 2 651 093 A1 describes a baking oven for the mass production of flattened food products, starting from a liquid mixture, on a horizontal cooking surface of a continuous conveyor having an upper portion, wherein, in accordance with a first embodiment, the cooking surface is defined by a plurality of cooking plates each independently hinged to a conveyor chain in at least a partially rotatable way, and wherein the baking oven comprises a dosing device to dose the liquid mixture onto the cooking plates, wherein the dosing device comprises a carousel provided with a plurality of molding members comprising rings to mold the flattened food products, wherein each molding member follows a path comprising an approaching step to the cooking surface, a step of loading a predetermined dose of liquid mixture onto a relative cooking plate, a first cooking step, wherein the molding member and the relative cooking plate move adjacently to one another so that to give the desired shape to the food products, and a step of moving the molding member away from the cooking surface, wherein, at the end of cooking, each cooking plate is tilted to unload the molded flattened and cooked products from it, at a lower portion of the conveyor opposite of the aforesaid upper portion.

Disadvantageously, the baking oven described in FR 2 651 093 A1 can only be used for liquid mixtures that quickly assume the consistency needed to maintain their shape, given that the molding members are only adjacent to the cooking plates during a first cooking step.

Moreover, and disadvantageously, the oven of FR 2 651 093 A1 is structurally and functionally particularly complex, providing a carousel of molding members and cooking plates independently and rotatably hinged to the conveyor chain.

SUMMARY OF THE INVENTION

The technical problem underlying the present invention has been to provide a continuous baking oven having structural and functional characteristics such as to overcome one or more of the aforesaid drawbacks of the known prior art.

According to the invention, the aforesaid problem is solved by a conveyor for a continuous baking oven, wherein the aforesaid conveyor is of closed-ring type and comprises an outer surface and an inner surface of the ring, characterized by comprising a plurality of seats intended to receive a food product to be cooked, wherein the seats of the aforesaid plurality of seats have respective mouths open essentially at the level of the aforesaid outer surface.

In substance, according to the invention, the aforesaid conveyor being of closed-ring type without inversion of the surfaces, a given outer surface remains as such along the entire length or extent of the aforesaid conveyor, whether it is stopped or in movement, whereas a given inner surface remains as such along the entire length or extent of the aforesaid conveyor, whether it is stopped or in movement.

Therefore, according to the invention, the aforesaid mouths are always open, essentially at the level of the aforesaid outer surface of the aforesaid conveyor, whether it is stopped or in movement.

Preferably, according to the invention, the aforesaid outer surface is comprised between the aforesaid mouths.

Preferably, the aforesaid seats consist of respective blind cavities.

Preferably, the aforesaid conveyor comprises a supporting portion defining the aforesaid inner surface and a cooking portion defining the aforesaid outer surface and the aforesaid plurality of seats, wherein the aforesaid supporting portion and the aforesaid cooking portion are combined with one another, preferably constrained to one another, more preferably in contact with one another.

Preferably, the aforesaid supporting portion is made of a first material and the aforesaid cooking portion is made of a second material, wherein the aforesaid first material and the aforesaid second material are different from one another.

Preferably, the aforesaid first material has a deformation coefficient lower than the deformation coefficient of the aforesaid second material. In practice, the aforesaid second material is more elastic than the aforesaid first material.

Preferably, the aforesaid supporting portion comprises a plurality of through-openings, wherein each seat of the aforesaid plurality of seats of the aforesaid cooking portion engages a respective through-opening of the aforesaid plurality of through-openings of the aforesaid supporting portion.

In practice, the aforesaid through-openings are corresponding and complementary to the shape of the aforesaid seats.

Preferably, each seat of the aforesaid plurality of seats extends beyond a respective through-opening of the aforesaid plurality of through-openings of the aforesaid supporting portion.

Preferably, the seats of the aforesaid plurality of seats are distributed along parallel rows longitudinally extending in the aforesaid conveyor.

Preferably, the aforesaid cooking portion comprises a plurality of modules, wherein each module of the aforesaid plurality of modules comprises a percentage of the aforesaid plurality of seats, wherein the modules of the aforesaid plurality of modules are longitudinally placed side by side adjacent to one another in the aforesaid conveyor.

Preferably, the aforesaid supporting portion is transversely rigid.

Preferably, the aforesaid supporting portion comprises a weave structure with weft and warp, wherein the aforesaid weave structure has a first portion impregnated with silicone in contact with the aforesaid cooking portion, and a second portion, opposing to the aforesaid first portion and impregnated with urethane.

Preferably, the aforesaid second material is silicone-based, more preferably a silicone reinforced with glass fibers.

This way, the present conveyor is sufficiently deformable at least in the so-called cooking portion comprising the seats for the food product and is, therefore, advantageously adaptable to a curved profile, as will become clearer hereinafter.

Simultaneously, the present conveyor preserves a sufficient rigidity, at least in the so-called supporting portion, which must not be subjected to pronounced deformations given it has to stay in tension to allow the correct operations, as will become clearer hereinafter.

Advantageously, according to the invention, a conveyor for a continuous baking oven already provided with containers or molds, in the sense that the containers or molds are obtained in one piece directly on the conveyor, is provided.

Still advantageously, the containers or molds, i.e. the aforesaid seats, therefore the aforesaid blind cavities, have the mouth at the level of the aforesaid outer surface of the closed-ring obtained from the conveyor, wherein the outer surface is a continuous surface.

This way, the running of the closed-ring conveyor causes an automatic overturning of the containers or molds, without having to resort to the removal thereof from the conveyor after cooking the food product and without having to reposition the containers or molds on the conveyor before a new cooking cycle. Therefore, the cooked food product is also automatically removed from the containers or molds of the conveyor.

Moreover, and advantageously, the containers or molds can be loaded with the desired food product in an automatic, simple and effective way, being able to remove any excess food product or spillage thereof from the containers or molds in the loading step, still in an automatic, simple and effective way by means of a scraper, such as, for example, a blade member arranged transversely to the conveyor and substantially positioned in contact with the aforesaid outer surface.

According to the above and to the present invention, the aforesaid problem is further solved by a continuous baking oven comprising a conveyor of the aforesaid type.

Therefore, the invention also provides a continuous baking oven for the preparation of a cooked food product, comprising a loading station of the food product to be cooked, a cooking station of the food product arranged downstream of the aforesaid loading station, and an unloading station of the cooked food product arranged downstream of the aforesaid cooking station, wherein the aforesaid continuous baking oven further comprises a conveyor of the aforesaid type, extended between the aforesaid loading station and the aforesaid unloading station, and movement means for the running of the aforesaid conveyor.

Preferably, the aforesaid movement means comprise a motor and at least one belt, one chain or one roller driven by the aforesaid motor, wherein the aforesaid at least one belt, chain or roller operates onto the aforesaid conveyor.

Preferably, the aforesaid continuous baking oven comprises a scraper, i.e. a member to remove the excess food product loaded in the aforesaid seats or spilled from the aforesaid seats, wherein the aforesaid scraper is arranged transversely to, and substantially in contact with, the aforesaid outer surface of the aforesaid conveyor, and wherein, more preferably, the aforesaid scraper is arranged between the aforesaid loading station and the aforesaid cooking station.

According to a preferred embodiment of the present invention, the aforesaid continuous baking oven comprises at least one roller in contact with the aforesaid conveyor wherein the seats of the aforesaid plurality of seats extend beyond the respective through-openings of the aforesaid plurality of through-openings, wherein the seats of the aforesaid plurality of seats are distributed along parallel rows longitudinally extending in said conveyor, wherein the aforesaid roller can be driven or not by the aforesaid motor, therefore wherein the aforesaid roller is a pulling roller or a support roller of the aforesaid conveyor, wherein the aforesaid roller is arranged at the aforesaid unloading station of the cooked food product, and wherein the aforesaid roller has a non-linear outer longitudinal profile, particularly an indented outer longitudinal profile, i.e. provided with at least one plurality of first projections alternating with respective recesses.

Preferably, the aforesaid first projections substantially have the same height and width from one another and are substantially equi-spaced from one another.

Preferably, the aforesaid first projections have a substantially stepped profile.

Preferably, the aforesaid roller with a non-linear outer longitudinal profile further comprises a plurality of second projections, wherein the aforesaid second projections alternate with the aforesaid first projections and have height lower than the height thereof, and wherein the aforesaid second projections have a convex profile.

In practice, during the running of the aforesaid conveyor in the present continuous baking oven, the aforesaid first projections of the aforesaid roller are between the aforesaid parallel rows of the aforesaid seats, whereas the aforesaid seats are between the aforesaid recesses or grooves comprised between the aforesaid first projections.

Moreover, and advantageously, the aforesaid second projections arranged at an intermediate portion of the aforesaid recesses or grooves are also at the aforesaid seats and help remove the food product from the seats, by deforming the lower surface of the same seats in the portion in which the conveyor is curved.

According to an embodiment of the invention, in order to obtain the aforesaid non-linear outer longitudinal profile, the aforesaid roller comprises a core, a plurality of first disks and a plurality of second disks removably and concentrically mounted on the aforesaid core, wherein the aforesaid first disks have a diameter greater than the diameter of the aforesaid second disks.

Preferably, the aforesaid first disks and the aforesaid second disks alternate with one another.

Preferably, each of the aforesaid first disks comprises a substantially flat side edge.

Preferably, each of the aforesaid second disks comprises an at least partially convex side edge.

Alternatively to the above, in order to obtain the aforesaid non-linear outer longitudinal profile, the aforesaid roller can comprise a core and a sleeve, the latter is removably fitted on the aforesaid core, and wherein the aforesaid sleeve has an outer surface shaped to form the aforesaid indented non-linear outer longitudinal profile.

In any case, preferably, the aforesaid roller comprises adjustable fastening means to secure the member or members making up the aforesaid non-linear outer longitudinal profile to the aforesaid core, therefore, the aforesaid disks or aforesaid sleeve, which comprise a ring having at least one slot mounted on the aforesaid core, a locking ring nut fitted on the aforesaid ring and comprising at least one bracket including a slot, and combining means to constrain the aforesaid ring and the aforesaid locking ring nut to one another through the respective slots.

This way, conveyors of different widths can be used in the present continuous baking oven.

According to the above, the present invention therefore also provides a roller of the aforesaid type and having a non-linear outer longitudinal profile, as considered above.

BRIEF DESCRIPTION OF THE FIGURES

Further characteristics and advantages of the invention will become clearer by the examination of the following detailed description of some preferred, but not exclusive, embodiments illustrated by way of example and without limitations, with the aid of the accompanying drawings, in which:

FIG. 2 shows a top perspective view of a detail of the continuous baking oven and the conveyor of FIG. 1;

FIG. 3 shows the detail of FIG. 2 during an operative step of the continuous baking oven and the conveyor according to the present invention, particularly an unloading step of a cooked food product;

FIGS. 4 and 5 show a detail of the conveyor according to the present invention according to a perspective top and side views, respectively;

FIGS. 6 and 7 show an exploded view of a detail of the conveyor according to the present invention, according to a perspective top and side views, respectively;

FIG. 8 shows a front view of a detail of the continuous baking oven of FIG. 1, specifically a roller having a non-linear outer longitudinal profile according to the present invention;

FIG. 9 shows a detail of the roller of FIG. 8 according to an embodiment variant of the invention.

DETAILED DESCRIPTION OF THE INVENTION

Figure 1:
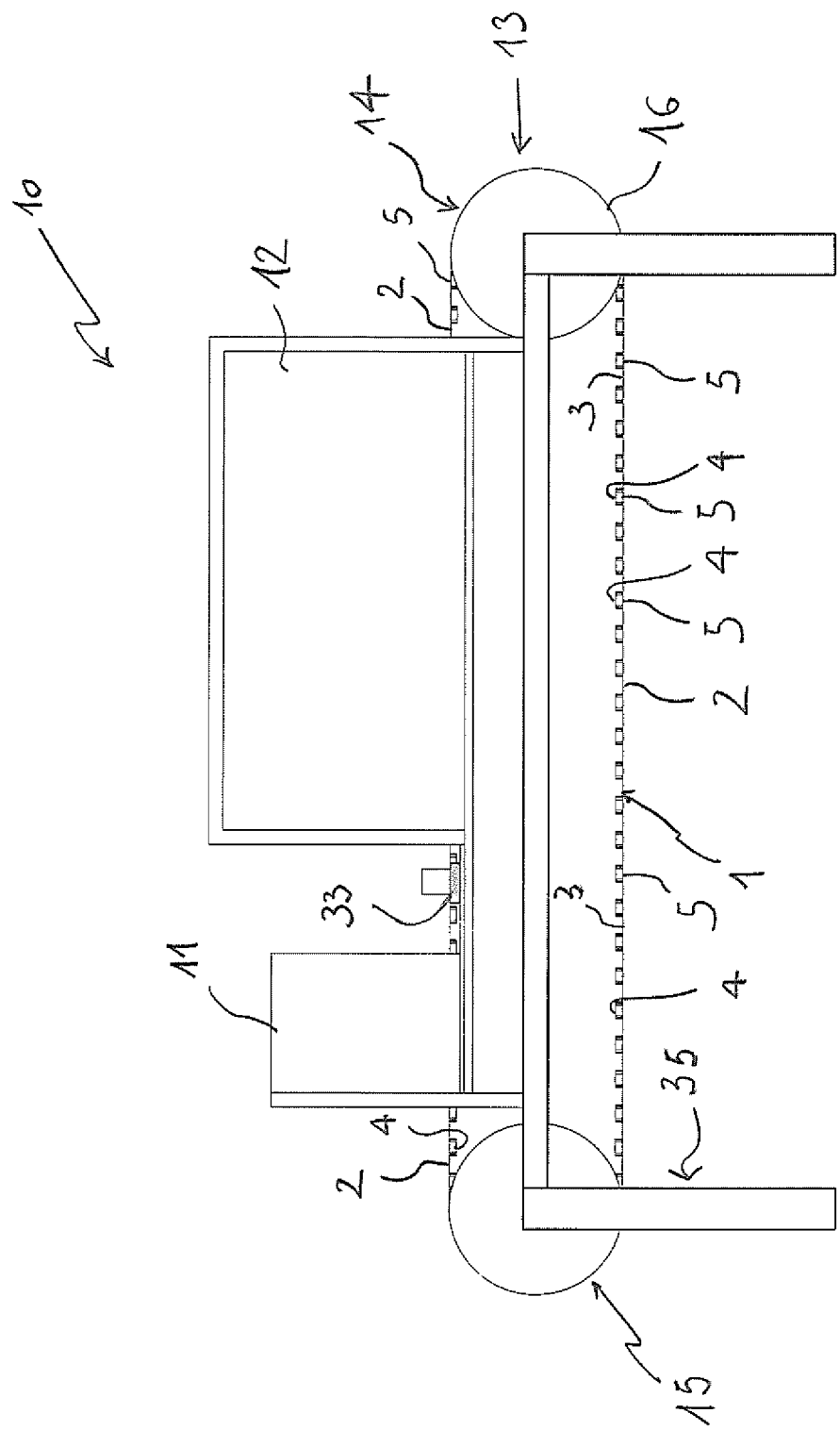
FIG. 1 schematically shows a side view of a continuous baking oven comprising a conveyor according to the present invention.

According to the aforesaid figures, 1 generally denotes a conveyor for a continuous baking oven according to the present invention.

The conveyor 1 is of the closed-ring type and comprises two linear portions parallel to one another and joined at the ends by two curved portions, defining an outer surface 2 and an inner surface 3 of the loop, wherein at least the outer surface 2 is a surface that extends continuously along the entire extent of the ring.

In other words, according to the present invention and to the examples of the figures, since the conveyor 1 is of the closed-ring type without inversion of the surfaces, a given outer surface of the conveyor, therefore of the ring, in the present case the outer surface 2, remains as such along the entire length or extent of the conveyor 1, whether it is stopped or in movement, whereas a given inner surface of the conveyor, therefore of the ring, in the present case the inner surface 3, remains as such along the entire length or extent of the conveyor 1, whether it is stopped or in movement.

According to the invention, the conveyor 1 comprises a plurality of seats intended to receive a food product to be cooked, wherein the seats of the plurality of seats denoted by 4 have respective mouths 5 essentially open at the level of the outer surface 2 of the conveyor, therefore of the ring.

Therefore, according to the invention, the mouths 5 are always essentially open at the level of the outer surface 2 of the conveyor 1, whether it is stopped or in movement, the outer surface 2 being comprised between the mouths 5.

As shown in the examples of the figures, in practice, the seats 4 consist of blind cavities.

Always according to the invention, the conveyor 1 comprises a supporting portion 6 defining the aforesaid inner surface 3 and a cooking portion 7 defining the aforesaid outer surface 2 and the seats 4, wherein the supporting portion 6 and the cooking portion 7 are combined with one another and, particularly, are in contact with and constrained to one another, advantageously by means of a food adhesive such as silicone for food products, for example.

Still according to the invention, it should be noted that the supporting portion 6 is made of a first material, whereas the cooking portion 7 is made of a second material, wherein the first material and the second material are different from one another.

In particular, the first material has a deformation coefficient lower than the deformation coefficient of the second material, where the deformation coefficient is a dimensionless size expressed in percentage and defined as the length variation with respect to the initial length, for a given stress.

In practice, the second material is a deformable material, more elastic than the first material.

More in detail, it should be noted that the supporting portion 6 is transversely rigid and comprises a weave structure with weft and warp, wherein the weave structure has a first portion impregnated with silicone in contact with the cooking portion 7, and a second portion, opposing to the first portion and impregnated with urethane.

As far as the second material is concerned, it should be noted that it is preferably silicone-based, more preferably a silicone reinforced with glass fibers.

Still according to the examples of the figures and to the present invention, the supporting portion 6 is provided with a plurality of through-openings denoted by 8, in a number equal to the number of seats 4 of the cooking portion 7, wherein each seat 4 engages a respective through-opening 8 and wherein each seat 4 preferably extends beyond a respective through-opening 8 of a portion of predetermined length.

Still, it should be added that, preferably, as shown in the examples of the figures, the seats 4 are distributed on parallel rows longitudinally extending in the conveyor 1.

Moreover, it should be said that the cooking portion 7 comprises a plurality of modules 9, wherein each module 9 comprises a percentage of the plurality of seats, and wherein the modules 9 are longitudinally placed side by side, adjacent to one another, in the conveyor 1, so as to obtain the aforesaid continuous outer surface.

According to the invention, a conveyor for a continuous baking oven provided with its containers or molds, in the sense that the same containers or molds, i.e. the aforesaid seats, are obtained in one piece directly on the conveyor and constitute an integral part thereof, is provided.

This way, the food product unloading operation can be carried out from the conveyor following its cooking step, simply by making the conveyor run and rotate, as will become clearer hereinafter.

Moreover, advantageously, the containers or molds, i.e. always the aforesaid seats, have mounts at the level of the outer surface of the ring obtained by the conveyor.

This way, any excess food product loaded in the seats and/or spilled from the seats during the loading thereof can be simply removed by making the conveyor run under a specific food product removing member, such as, for example, a scraper comprising a blade, as will become clearer hereinafter.

According to the above, the conveyor 1 shown above and to which description reference is made, is used in a continuous baking oven according to the present invention, which is generally denoted by 10 in the examples of the figures.

In detail, in addition to the conveyor 1, the continuous baking oven 10 comprises a loading station 11 of a food product to be cooked, specifically grated cheese, a cooking station 12 of the product arranged downstream of the loading station 11, an unloading station 13 of the cooked food product arranged downstream of the cooking station 12 and movement means for the running of the conveyor 1, generally denoted by 14.

More particularly, in the continuous baking oven 10, the conveyor 1 extends between the loading station 11 and the unloading station 13, between which it runs in a closed movement, in practice rotary, being driven on one side by the aforesaid movement means 14 and supported on the other side by designated supporting and running means denoted by 15.

According to the examples of the figures, the movement means 14 comprise a roller 16 and a motor active on the roller 16, not shown in the figures, given that the possibility to provide different movement means, such as motorized belts or chains active on the conveyor, is not however excluded.

In particular, the roller 16 is in contact with the supporting portion 6 of the conveyor 1 at the loading station 13 of the food product, i.e. where the closed-ring conveyor 1 inverts its running direction.

According to the invention, the roller 16 has a non-linear outer longitudinal profile denoted by 17 and, particularly, the outer longitudinal profile 17 is indented.

In other words, the roller 16 at the outer longitudinal profile 17 is provided with a plurality of first projections 18 alternating with respective recesses.

In detail, the first projections 18 substantially have the same height and width from one another and are, moreover, substantially equi-spaced from one another.

In practice, the first projections 18 define a substantially stepped profile.

According to a further preferred embodiment of the invention, the roller 16 with the non-linear outer longitudinal profile further comprises a plurality of second projections 19 which, according to the examples of the figures, alternate with the first projections 18, which have a height lower than the height of the first projections 18, and which have a convex profile, particularly roundish.

According to an embodiment of the invention, in order to obtain the aforesaid non-linear outer longitudinal profile 17, the roller 16 comprises a core 20, a plurality of first disks 21 and a plurality of second disks 22 concentrically mounted on the core 20, wherein the first disks 21 have a diameter greater than the diameter of the second disks 22.

In particular, each of the first disks 21 comprises a substantially flat side edge 23, whereas each of the second disks 22 comprise an at least partly convex side edge denoted by 24, as shown in the example of FIG. 8.

In detail, the first disks 21 and the second disks 22 alternate one another, given that the possibility of providing different disk arrangements according to the outer profile to be obtained is not, however, excluded, and given that the possibility to obtain the aforesaid non-linear outer longitudinal profile by means of a roller comprising a core and a sleeve removably fitted on the core, is not excluded, wherein the sleeve has an outer surface shaped in the form of the aforesaid indented outer longitudinal profile, this last embodiment being shown in the example of FIG. 9 wherein a detail of the aforesaid sleeve is denoted by 25.

In any case, in both of the aforesaid embodiments, the aforesaid roller 16 preferably comprises adjustable fastening means generally denoted by 26, to secure the member or members making up the aforesaid non-linear outer longitudinal profile to the core 20, therefore the aforesaid disks or aforesaid sleeve, which comprise a ring 27 mounted on the core 20 and having one or more slots 28, a locking ring nut 29 fitted on the ring 27 and comprising one or more brackets 30 including respective slots 31, and combining means 32, such as, for example, a screw with a threaded nut, to constrain the ring 27 and the locking ring nut 29 to one another through the respective slots.

This way, conveyors of different widths can be used in the present continuous baking oven, also depending on the dimensions of the food product to be prepared, as will become clearer hereinafter.

Therefore, according to the above, the present invention also provides a roller of the type described above in the different embodiments and having a non-linear outer longitudinal profile as considered above.

Still according to the invention, the continuous baking oven 10 comprises a scraper 33, i.e. a member for the removal of the excess food product loaded in the seats 4 or spilled from the seats 4, wherein the scraper 33 is arranged transversely to the conveyor 1, substantially in contact with its outer surface 2, preferably between the loading station 11 and the cooking station 12, the possibility to provide a scraper inside the loading station 11 of the food product not being, however, excluded.

Finally, as regard the supporting and running means 15 of the conveyor 1, it should be noted that, according to the preferred embodiments described above, they take the form of a second roller also having a non-linear outer longitudinal profile, and particularly an indented outer longitudinal profile.

Also in this case, the outer longitudinal profile of the second roller is provided with a plurality of first projections alternating with respective recesses all similar to the aforesaid first projections 18 to which description reference is made.

Unlike the roller 16, the second roller of the supporting and running means 15 does not comprise second projections of the type described above, which instead favor the removal of the cooked food product from the conveyor 1 and which particularly favor the ejection of the cooked food product from the seats 4 at the unloading station 13 of the continuous baking oven according to the present invention.

With regard to this, the example of FIG. 3 shows a cooked food product 34 essentially circular in shape, the possibility to obtain food products of different shapes, such as a bar, depending on the conformation of the seats of the present conveyor, not being, however, excluded.

Finally, it should be noted that the continuous baking oven 10 comprises a frame generally denoted by 35 and that the loading station 11 and the cooking station 12 are of known type and therefore not described in detail.

The advantages of the present invention already made clearer in the above description can be summarized by noting that a conveyor for a continuous baking oven is provided, and a continuous baking oven comprising such a conveyor, wherein the conveyor is already provided with containers or molds so that the overturning of the same containers or molds for the removal of the cooked food product is, in practice, carried out in the zone in which the conveyor inverts its running direction, therefore on a supporting and/or movement roller of the conveyor positioned at the outlet of the cooking station of the food product.

This way, a food product, such as a grated cheese-based snack, can be obtained with a particularly simple and economic process, totally automated and comprising a minimum number of operative steps.

In order to meet incidental and specific requirements, several variations and modifications could be made by a field technician to the illustrated and described embodiments of present invention, provided that all are included in the scope of protection of the invention as defined by the following claims.

The invention claimed is:

1. A conveyor (1) for a continuous baking oven, wherein said conveyor (1) is of closed-ring type and comprises an outer surface (2) and an inner surface (3), the conveyor further comprises a plurality of seats (4) configured to receive a food product to be cooked, wherein the seats of said plurality of seats have respective mouths (5) open at the level of said outer surface (2), the conveyor further comprising a supporting portion (6) defining said inner surface (3), and a cooking portion (7) defining said outer surface (2) and said plurality of seats (4), wherein said supporting portion (6) and said cooking portion (7) are combined, constrained and in contact one with the other and wherein said supporting portion (6) is made of a first material and said cooking portion (7) is made of a second material, wherein said first material and said second material are different from one another and wherein said first material has deformation coefficient lower than the deformation coefficient of said second material, said second material being more elastic than said first material.

2. The conveyor according to claim 1, wherein said seats (4) are blind cavities.

3. The conveyor according to claim 1, wherein the seats (4) of said plurality of seats are distributed along parallel rows longitudinally extending in said conveyor (1).

4. The conveyor according to claim 1, wherein said cooking portion (7) comprises a plurality of modules (9), wherein each module of said plurality of modules comprises a percentage of said plurality of seats, wherein the modules (9) of said plurality of modules are longitudinally placed side by side, adjacent to one another, in said conveyor.

5. The conveyor according to claim 1, wherein said supporting portion (6) is transversely rigid, and comprises a weave structure with weft and warp, said weave structure comprising a first portion impregnated with silicone in contact with said cooking portion (7) and a second portion opposite said first portion and impregnated with urethane.

6. The conveyor according to claim 1, wherein said second material is silicone-based, reinforced with glass fibers.

7. A conveyor (1) for a continuous baking oven, wherein said conveyor (1) is of closed-ring type and comprises an outer surface (2) and an inner surface (3), the conveyor further comprises a plurality of seats (4) configured to receive a food product to be cooked, wherein the seats of said plurality of seats have respective mouths (5) open at the level of said outer surface (2), the conveyor further comprising a supporting portion (6) defining said inner surface (3), and a cooking portion (7) defining said outer surface (2) and said plurality of seats (4), wherein said supporting portion (6) comprises a plurality of through-openings (8), wherein each seats (4) of said plurality of seats of said cooking portion (7) engages a respective through-opening (8) of said plurality of through-openings.

8. The conveyor according to claim 7, wherein each seat (4) of said plurality of seats extends beyond a respective through-opening (8) of said plurality of through-openings.

9. A continuous baking oven (10) for preparing a cooked food product (34), comprising a loading station (11) to load the food product to be cooked, a cooking station (12) to cook the food product and arranged downstream of said loading station (11), and an unloading station (13) to unload the cooked food product (34) and arranged downstream of said cooking station (12), wherein said continuous baking oven comprises a conveyor (1) according to claim 1, said conveyor (1) being extended between said loading station (11) and said unloading station (13), and movement means (14) for the running of said conveyor (1), the oven further comprising at least one roller (16) in contact with said conveyor (1) arranged at said unloading station (13), wherein said roller (16) has non-linear outer longitudinal profile, and an indented outer longitudinal profile having at least one plurality of first projections (18).

10. The continuous baking oven according to claim 9, wherein said movement means (14) comprise a motor and at least one belt, one chain or one roller (16) driven by said motor, wherein said at least one belt, chain or roller operates onto said conveyor.

11. The continuous baking oven according to claim 9, wherein said first projections (18) are substantially-equally spaced from one another and substantially have the same height and width as each other said first projections defining a substantially stepped profile.

12. The continuous baking oven according to claim 9, wherein said outer longitudinal profile (17) of said roller (16) comprises a plurality of second projections (19), wherein said second projections (19) alternate with said first projections (18) and have height lower than the height thereof, wherein said second projections have convex profile, and wherein said second projections have roundish profile.

13. The continuous baking oven according to claim 9, wherein said roller (16) comprises a core (20) and a sleeve which is removably fitted on said core, and wherein said sleeve has an outer surface shaped to form said non-linear outer longitudinal profile, or said roller (16) comprises a core (20), a plurality of first disks (21) and a plurality of second disks (22) removably and concentrically mounted on said core (20), wherein said first disks (21) have diameter greater than the diameter of said second disks (22).

14. The continuous baking oven according to claim 13, wherein said roller (16) comprises adjustable fastening means (26) to secure said sleeve or said plurality of first disks (21) and said plurality of second disks (22) on said core (20), wherein said adjustable fastening means (26) comprise a ring (27) which is mounted on said core (20) and has at least one slot (28), a locking ring nut (29) which is fitted on said ring (27) and comprises at least one bracket (30) including a slot (31), and combining means (32) to constrain said ring (27) and said locking ring nut (29) one to another through the respective slots.

15. The continuous baking oven according to claim 9, further comprising a scraper (33) for removing possible excess food product loaded in said seats (4) or escaped from said seats (4), wherein said scraper (33) is arranged transversely to, and substantially in contact with, said outer surface (2) of said conveyor (1), between said loading station (11) and said cooking station (12).

\* \* \* \* \*